United States Patent
Pitard et al.

(10) Patent No.: US 7,751,951 B2
(45) Date of Patent: Jul. 6, 2010

(54) METHOD FOR CHECKING TAKEOFF OR LANDING PARAMETERS, AND ASSOCIATED DEVICE

(75) Inventors: Fabien Pitard, Toulouse (FR); Jean-Pierre Demortier, Maurens (FR); Serge Laporte, Aurade (FR); Serge Boyer, Eaunes (FR); Bernard Deret, Fonsegrives (FR); Laurent Fonteneau, Toulouse (FR)

(73) Assignee: AIRBUS France, Toulouse (FR)

( * ) Notice: Subject to any disclaimer, the term of this patent is extended or adjusted under 35 U.S.C. 154(b) by 734 days.

(21) Appl. No.: 11/563,743

(22) Filed: Nov. 28, 2006

(65) Prior Publication Data

US 2007/0124034 A1    May 31, 2007

(30) Foreign Application Priority Data

Nov. 28, 2005    (FR) .................................. 05 12020

(51) Int. Cl.
 *G06F 19/00* (2006.01)
(52) U.S. Cl. ............................. 701/15; 701/16; 340/959
(58) Field of Classification Search ...................... 701/3, 701/14–16; 340/959; 244/63; 434/50
See application file for complete search history.

(56) References Cited

U.S. PATENT DOCUMENTS

| 3,691,356 | A | | 9/1972 | Miller |
| 4,837,695 | A | * | 6/1989 | Baldwin ...................... 701/15 |
| 7,158,052 | B2 | * | 1/2007 | Zammit-Mangion et al. ......................... 340/959 |
| 2004/0183698 | A1 | | 9/2004 | Rouquette et al. |
| 2004/0260434 | A1 | | 12/2004 | Zammit-Mangion et al. |

FOREIGN PATENT DOCUMENTS

| FR | 2 118 504 | 7/1972 |
| FR | 2 852 684 | 9/2004 |

OTHER PUBLICATIONS

U.S. Appl. No. 11/559,917, filed Nov. 15, 2006, Lemoult et al.
U.S. Appl. No. 11/563,743, filed Nov. 28, 2006, Pitard et al.

* cited by examiner

*Primary Examiner*—Yonel Beaulieu
(74) *Attorney, Agent, or Firm*—Oblon, Spivak, McClelland, Maier & Neustadt, L.L.P.

(57) ABSTRACT

A method for checking takeoff or landing parameters of an aircraft including a step of determining takeoff or landing parameters on the basis of a series of input conditions. The method includes steps of calculating regulatory data on the basis of determined takeoff or landing parameters; and of comparing the calculated regulatory data with predefined threshold values, with a view to establishing whether the determined takeoff or landing parameters are valid or invalid.

16 Claims, 3 Drawing Sheets

METHOD FOR CHECKING TAKEOFF OR LANDING PARAMETERS, AND ASSOCIATED DEVICE

BACKGROUND OF THE INVENTION

1. Field of the Invention

The present invention relates to a method for checking takeoff or landing parameters of an aircraft.

It also relates to a checking device designed to employ the method according to the invention.

2. Discussion of the Background

During takeoff and landing of an aircraft, the pilot must determine the parameters associated with each maneuver.

During takeoff in particular, the decision, rotation and climb speeds must be determined, as must the engine thrust level during takeoff or even the flap extension, etc.

Similarly, during landing, the approach speed is determined, as is also the maximum landing weight, for example.

The choice of these parameters will modify the takeoff or landing trajectory as well as the maximum takeoff or landing weight.

By careful choice of the parameters, it is possible to load the maximum freight on board the aircraft or to minimize engine wear in complete safety.

Traditionally, optimization of parameters takes place during ground preparations for the flight. Parameter optimization takes into account, in particular, initial conditions such as aircraft weight, weather and available runway length.

Nevertheless, at the instant of takeoff, it is possible that the initially planned parameters are no longer complied with, and so the pilot must predetermine these parameters on the basis of charts, whose reliability, can be variable.

There also exist systems making it possible to determine, on the basis of a series of input conditions, takeoff or landing parameters, which systems are on board the aircraft and can be directly used by the pilot. A parameter-determination module uses calculation methods equivalent to those traditionally used during ground preparation for the flight.

Such an on-board module makes it possible to determine optimized takeoff or landing parameters as a function of input conditions that may depend in particular on aircraft condition, atmospheric data and data related to the airport.

As for a calculation run on the ground, the parameters determined in this way are supposed to comply with the regulatory constraints. To do this in the case of a calculation on the ground, the operator must compare the results output by an optimized determination module with a flight manual. This flight manual is a full module certified for use on the ground and employing a database representing the aircraft, which is itself certified.

Nevertheless, the on-board parameter-determination module is more complex than the flight-manual module used on the ground, because it makes it possible to calculate optimized parameters (such as takeoff velocities or Take Off Speeds), and it uses means for accelerating the calculation. In addition, it is not certified and, compared with the flight manual, it may exhibit differences that may lead to determination of parameters outside the ranges of regulatory values.

SUMMARY OF THE INVENTION

The objective of the present invention is to provide a method for checking takeoff or landing parameters making it possible reliably to determine the optimum takeoff or landing parameters, thus easing the pilot's burden of work and verification.

According to a first aspect, a method according to the invention for checking takeoff or landing parameters of an aircraft comprises a step of determining the said takeoff or landing parameters on the basis of a series of input conditions.

According to the invention, this checking method additionally comprises the following steps:

calculation of regulatory data on the basis of the said determined takeoff or landing parameters; and comparison of the said calculated regulatory data with predefined threshold values, with a view to establishing whether the said determined takeoff or landing parameters are valid or invalid.

The comparisons to be performed are most often defined by the regulations.

Thus it is possible to be certain that the determined parameters accurately comply with the regulatory constraints and to verify that the calculation software for determining the takeoff or landing parameters on the basis of a series of input conditions does not generate erroneous results in conflict with predefined threshold values for regulatory data.

In practice, in the step of determination of takeoff or landing parameters, the parameters are calculated by means of a calculation function corresponding partly to a calculation function of a flight manual certified for use on the ground.

In the determination step, iterative optimization methods are used to find the maximum takeoff weight, for example, and the takeoff speeds associated with this weight: these iterative methods take into account the parameters of the day (aircraft configuration, runway, atmosphere, etc.) and the constraints to be complied with, which are the regulatory constraints (such as minimum speeds) and the runway constraints (such as runway length).

Furthermore, in the step of calculation of regulatory data, these regulatory data are calculated by means of a calculation function identical to a calculation function of a flight manual certified for use on the ground and by means of an aircraft database certified for use on the ground.

In the said calculation step, the regulatory data are calculated on the basis of a first subset of the series of input conditions and of the said determined takeoff or landing parameters.

This calculation step therefore uses the optimization results (weight, takeoff speeds) as well as the parameters of the day to recalculate data subject to regulatory or runway constraints.

In addition, in the comparison step, the predefined threshold values correspond to a second subset of the series of input conditions as well as to data contained in an aircraft database certified for use on the ground.

Furthermore, the checking method additionally comprises the following steps:

calculation of a takeoff distance with all engines operative on the basis of determined takeoff parameters; and comparison of the said takeoff distance with an available takeoff distance belonging to the said series of input conditions with a view to establishing whether the said determined takeoff parameters are valid or invalid.

In this way it is possible to verify, during takeoff, that the distance necessary for takeoff is indeed sufficient and, in practice, is shorter than the available takeoff distance.

In order to ensure the reliability of this verification, which corresponds to a very sensitive regulatory datum, the calculation function used during the step of calculation of takeoff distance is different from the calculation function used in the said step of determination of takeoff parameters. Preferably, the aircraft database used is also different from the aircraft database certified for use on the ground.

In this way, the database used is different from that used during the step of determination of takeoff or landing parameters and of calculation of regulatory data.

According to another aspect of the invention, a device for checking takeoff or landing parameters of an aircraft comprises means for determining the said takeoff or landing parameters on the basis of a series of input conditions.

According to the invention, this device comprises means for calculating regulatory data on the basis of determined takeoff or landing parameters and means for comparing calculated regulatory data with predefined threshold values with a view to establishing whether the determined takeoff or landing parameters are valid or invalid.

This checking device has characteristics and advantages analogous to those described hereinabove as regards the checking method according to the invention.

Finally, the present invention relates to an aircraft equipped with a checking device according to the invention and designed to employ the checking method according to the invention.

Other special features and advantages of the invention will also become apparent in the description hereinafter.

BRIEF DESCRIPTION OF THE DRAWINGS

In the attached drawings, provided by way of non-limitative examples.

DETAILED DESCRIPTION OF THE PREFERRED EMBODIMENTS

Figure 1:
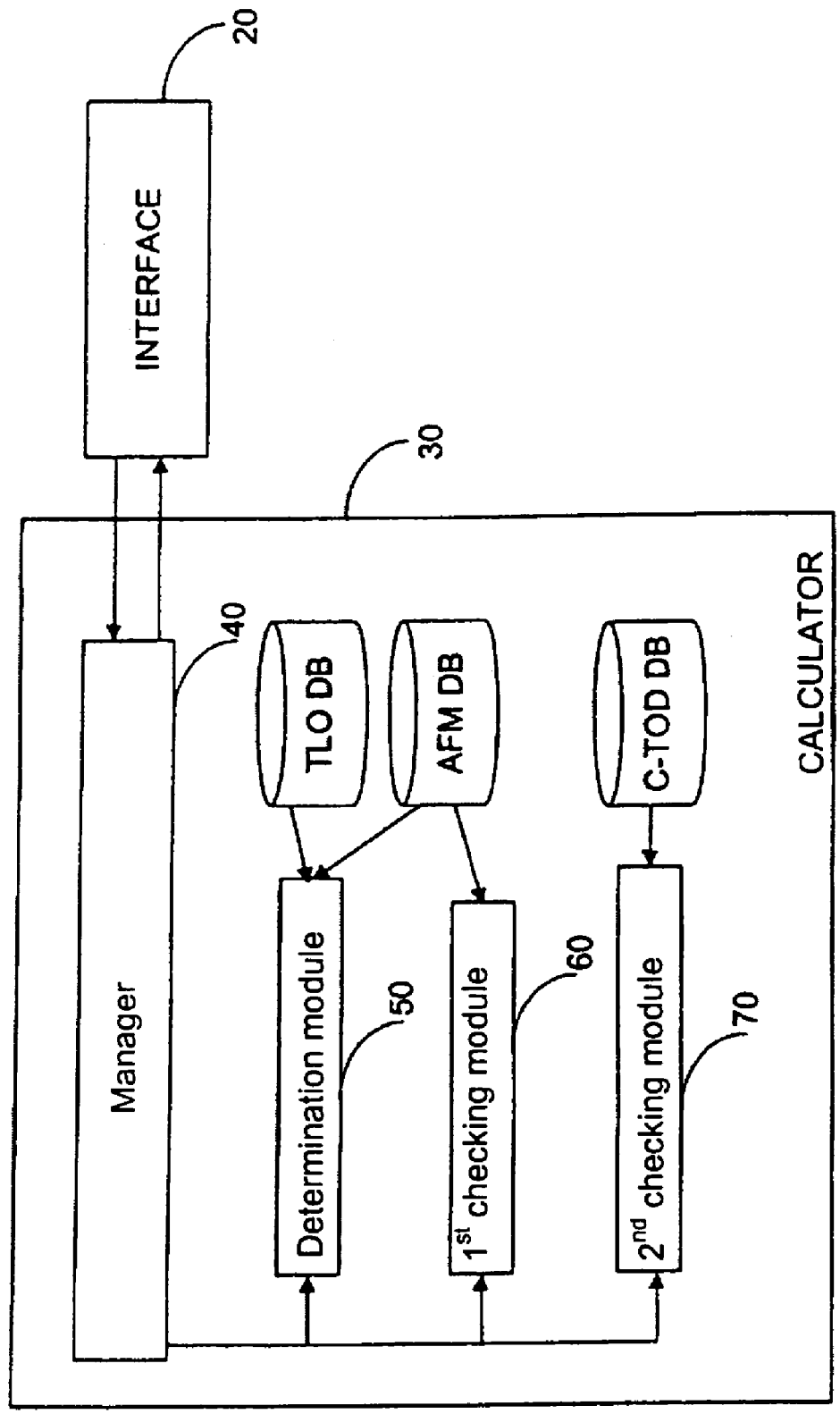
FIG. 1 is a block diagram illustrating a checking device according to one embodiment of the invention.

Referring to FIG. 1, there will first be described a device according to one embodiment of the invention for checking takeoff or landing parameters of an aircraft.

The checking device is integrated in an on-board system in the aircraft, directly accessible to the pilot. The checking device may or may not be integrated with the avionics.

The checking device is provided with an interface 20 permitting a dialog with the pilot by virtue of classical communication means such as keyboard, screen, etc.

In particular, interface 20 permits the pilot to acquire input conditions that will be taken into account for the calculation of takeoff or landing parameters of the aircraft.

Furthermore, interface 20 is provided with a display system of the screen type to permit viewing of the results of the parameters calculated by a calculator 30.

Management of the data flows between interface 20 and a calculator 30 is achieved via a data manager 40.

In particular, manager 40 makes it possible to transmit input data to different calculation modules 50, 60, 70 of calculator 30, to be described hereinafter.

Conversely, at the output of manager 40, the parameters output from the calculator may be sent at least in part to interface 20 for the purpose in particular of displaying them on a screen.

Calculator 30 is provided with a determination module 50 for calculating and determining takeoff or landing parameters on the basis of a series of input conditions, with a first checking module 60 and with a second checking module 70. The functions and characteristics of these different modules 50, 60, 70 will be explained hereinafter with reference to FIG. 2.

Parameter-determination module 50 makes it possible to optimize the takeoff or landing parameters by using known calculation methods already employed traditionally during ground preparations for flights.

The calculation methods used are generally complex, and they may or may not integrate approximation methods to accelerate the convergence of calculations of optimized parameters.

Figure 2:
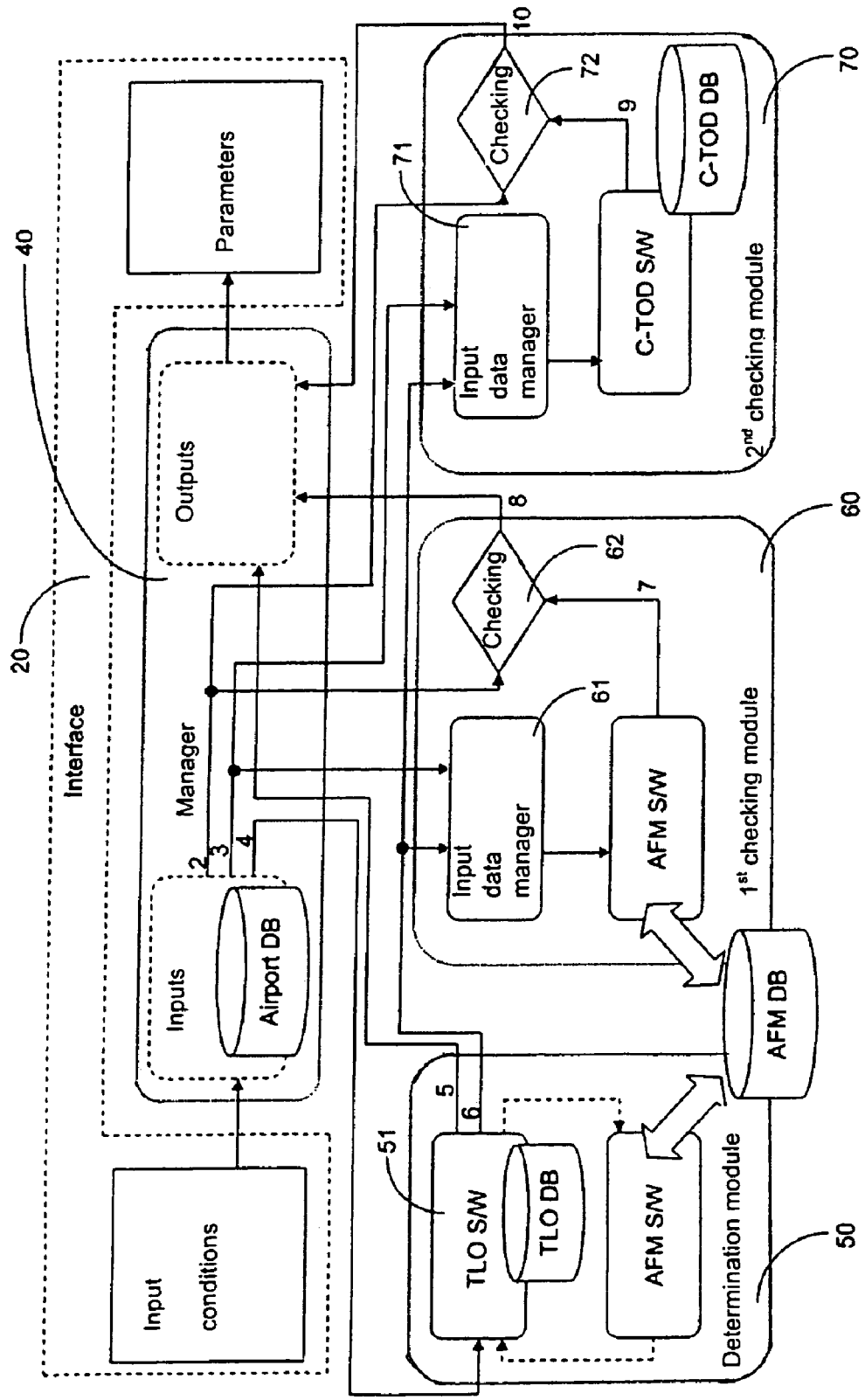
FIG. 2 is a block diagram illustrating the data flows in a checking device such as illustrated in FIG. 1.

The input conditions used by determination module 50 for calculating the takeoff or landing parameters are obtained both from input conditions acquired by the pilot at interface 20 and input conditions stored in memory in manager 40, for example in an airport database, also designated as AIRPORT DB in FIG. 2.

In particular, these input conditions comprise data on the atmospheric conditions, such as exterior temperature, wind speed and direction, runway condition (dry, wet, etc.), sea-level pressure, etc.

Furthermore, the input conditions comprise data on the condition of the aircraft, such as aerodynamic configuration, engine speed, takeoff weight, condition of the anti-icing and air conditioning systems, and if necessary data on inoperative devices of the aircraft.

Finally, the input conditions contain data that relate to the airport that can be acquired by the pilot or directly stored in memory in the airport database. These data concern in particular the runways, especially runway length, runway altitude, runway slope, available ground-run distance to takeoff, distance between the starting threshold of the runway and the alignment point of the aircraft at takeoff, presence of a clearway or stopway, or presence of obstacles.

Of course, this list of input conditions is in no way limitative.

On the basis of input conditions, determination module 50 determines, within a calculation and optimization module 51, the parameters corresponding to the maximum performances of the aircraft for the envisioned takeoff or landing.

Calculation and optimization module 51 employs a calculation function designated as TLO SW in FIG. 2 (Take-off and Landing Optimization in English), and it is similar to a calculation module used on the ground. This calculation module uses data that have been precalculated to varying degrees and compiled in a database designated as TLO DB in FIG. 2. For certain calculations, it also relies on the calculation kernel AFM S/W (aircraft flight manual or Aircraft Flight Manual in English), which itself uses data grouped in an aircraft database certified for use on the ground and designated as flight manual data AFM DB (Aircraft Flight Manual DataBase in English). This aircraft database is designed to group all of the data characterizing the aircraft, and in particular its aerodynamics, its engine and geometric characteristics, and also certain regulatory threshold values.

This database AFM DB is identical to an aircraft file certified for use on the ground by the certification authorities.

Calculation and optimization module 51 is supposed to comply with the regulatory constraints, and it makes it possible to optimize different takeoff or landing parameters of the aircraft.

Among the determined parameters, the following parameters are determined at the instant of takeoff:

decision speed V1,
rotation speed VR,
takeoff speed V2,
maximum takeoff weight MTOW, etc.

Similarly, the following parameters can be determined at the instant of landing:

maximum landing weight, approach speed Vapp,
landing distance LD,
difference $\Delta V_{REF}$ relative to the reference landing speed, etc.
the coefficient $K_{LD}$ of correction of the nominal landing distance in the case of failures during flight that modify the landing performances of the aircraft, etc.

The parameters determined in this way by determination module 50 can be sent to manager 40 and transferred at the output to interface 20, with a view, for example, to subsequent display of these parameters if they are validated by the checking modules described hereinafter.

In order to ensure reliability of calculation of these optimized parameters, a first checking module 60 is provided in calculator 40.

This first checking module comprises means 61 for calculating regulatory data on the basis in particular of takeoff or landing parameters determined previously by determination module 50.

This first checking module 60 makes it possible to validate the determined optimized parameters by verifying that they comply with regulatory data, such as trajectories obtained from the flight manual AFM in anticipation of an engine failure, as well as runway lengths and obstacles supplied by the airport database AIRPORT DB.

Means 61 for calculating regulatory data use a calculation function identical to that employed by calculation and optimization means 51 of determination module 50: it involves the calculation kernel AFM SW. This calculation module 61 also uses the same aircraft database AFM DB as determination module 50.

Thus the source code of the calculation function of calculation module 61 and the database used are identical to those used to perform manual flight calculations for use on the ground.

First checking module 60 is additionally provided with comparison means 62 designed to compare the regulatory data calculated by calculation means 61 with predefined threshold values obtained primarily from the airport database or from the aircraft database AFM DB, with a view to establishing whether the determined takeoff or landing parameters are valid or invalid.

A non-limitative list of regulatory data is presented below in association with predefined threshold values corresponding to regulatory limitations.

In general, the first checking module makes it possible to calculate regulatory data for takeoff or landing (distance, climb gradient, speed) on the basis of a certain number of input conditions and of optimized parameters calculated by the determination module (maximum takeoff or landing weight, speed).

| CALCULATED REGULATORY DATA | PREDEFINED THRESHOLD VALUES |
|---|---|
| VLOF0 (takeoff speed, all engines operative) | Tire limit speed |
| VLOF1 (takeoff speed, one engine inoperative) | Tire limit speed |
| VR (rotation speed) | 1.05*VCMA (minimum aerodynamic control speed) |
| V2 (climb speed at takeoff) | 1.10/VCMA (minimum aerodynamic control speed) |
| V2 (climb speed at takeoff) | VMU1 (minimum takeoff speed, one engine inoperative) |
| V screen height (speed attained at an altitude of 35 feet) | VMU0 (minimum takeoff speed, all engines) |
| FSG (first segment gradient) | Minimum FSG value |
| SSG (second segment gradient) | Minimum SSG value |
| TOD0 (takeoff distance, all engines operative) | TODA (available takeoff distance) |
| TOR0 (ground run distance to takeoff, all engines operative) | TORA (available ground run distance to takeoff) |
| ASD0 (accelerate-stop distance, all engines operative) | ASDA (available accelerate-stop distance) |
| ASD1 (accelerate-stop distance, one engine inoperative) | ASDA (available accelerate-stop distance) |
| TOD1 (takeoff distance, one engine inoperative) | TODA (available takeoff distance) |
| TOR1 (ground run to takeoff, one engine inoperative) | TORA (available ground run to takeoff) |
| Takeoff trajectory with one engine inoperative | Minimum margin of 35 feet of the net trajectory relative to the obstacle |
| ALD (true landing distance) | LDA (available landing distance) |
| RLD (regulatory landing distance) | LDA (available landing distance) |
| Throttle gradient, one engine inoperative | Minimum throttle gradient, one engine inoperative |
| Throttle gradient, all engines operative | Minimum throttle gradient, all engines operative |

According to the regulatory data, these calculated data must be greater or smaller than the predetermined threshold values.

As an example, the takeoff speed with all engines or with one engine inoperative must remain lower than the limit tire speed.

Similarly, all calculated distances (run, takeoff, accelerate-stop) must remain shorter than the available distances.

On the other hand, the first and second segment gradients must be greater than the minimum FSG or SSG values.

In practice, the calculation and optimization functions used can be traditional functions employed in an on-board system of the aircraft.

As a non-limitative example, it is possible to use methods for integrating equations of mechanics on the ground or methods for processing precalculated data.

Calculator 40 is also provided with a second checking module 70. Second checking module 70 differs from checking module 60 and from determination module 50 in both the calculation function employed and the data used.

In general, the objective of second checking module 70 is to verify, for the optimized parameters determined by determination module 50, the ability of the aircraft to take off without inoperative engines on the runway under consideration.

This second module is used only at the instant of takeoff, with a view to verifying the compatibility of the determined takeoff distance with the available takeoff distance.

In practice, this second checking module 70 comprises calculating means 71 designed to calculate a takeoff distance TOD0 with all engines operative on the basis of takeoff parameters determined previously by determination module 50.

It is also provided with comparing means 72 designed to compare this takeoff distance TOD0 with an available takeoff distance TODA in order to establish whether the determined takeoff parameters are valid or invalid.

The available takeoff distance TODA belongs to the series of input conditions, and it can be stored in memory in the airport database.

In order to ensure reliability of the calculation of this takeoff distance, calculation means 71 of second checking module 70 use a calculation function different from that employed by calculation and optimization means 51 of determination module 50 and by calculating means 61 of first checking module 60.

Furthermore, the aircraft database C-TOD DB used is different from the aircraft database AFM DB employed by determination module 50 and first checking module 60.

The calculation of takeoff distance with all engines operative is performed on the basis of, in particular, rotation speed VR, safety takeoff speed V2 and maximum takeoff weight MTOW.

Calculation means 71 therefore use a simplified function for calculation of the takeoff distance TOD0 with all engines operative. As a non-limitative example, this simplified method primarily comprises establishing an approximation of a real takeoff (corresponding to a ground-run phase plus a phase of flying up to 35 feet), by considering a single ground-run phase whose length is equal to the real takeoff length.

Considering this example of a simplified method for the takeoff distance TOD0 with all engines operative, the ground run is performed starting from zero speed up to a final speed VF, whose value can be deduced on the one hand from rotation speed VR and takeoff safety speed V2 determined by determination module 50, and on the other hand from a predetermined speed increment $\Delta V2$ or $\Delta VR$ stored in memory in a database C-TOD BD integrated into the second checking module.

This speed increment depends on several input parameters, and in particular on thrust, altitude, aircraft aerodynamics and takeoff weight.

The final speed VF is therefore equal to:

$$VF = V2 + \Delta V2 = VR + \Delta VR$$

The run distance can then be calculated by integrating the final speed VF according to the mechanics equation of the ground run:

$$m\frac{dV}{dt} = Fn - R_D - \beta \cdot mg - \mu(mg - R_L)$$

in which:
Fn=thrust ("thrust" in English)
$R_D$=drag ("drag" in English)
$R_L$=lift ("lift" in English)
m=takeoff weight ("take off weight" in English)
$\beta$=runway slope ("runway slope" in English)
$\mu$=coefficient of friction ("friction coefficient" in English)

Figure 3:
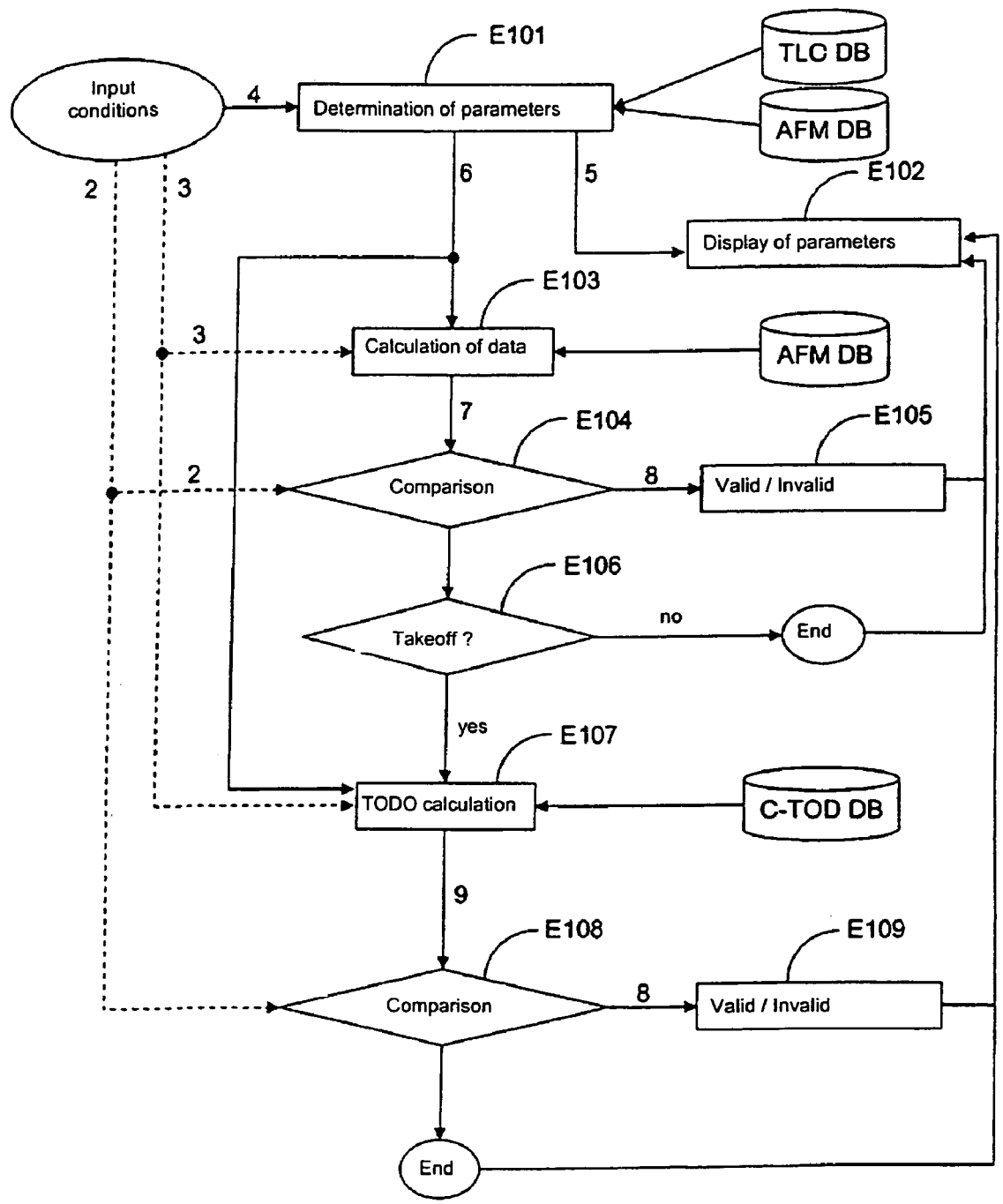
FIG. 3 is an algorithm illustrating the checking method according to one embodiment of the invention.

Referring now to FIG. 3 there will be described the checking method employed by the device such as described in the foregoing with reference to FIGS. 1 and 2.

The method for checking takeoff or landing parameters of an aircraft comprises firstly a step E101 of determination of a set of optimized takeoff or landing parameters on the basis of a series of input conditions.

As explained hereinabove, the input conditions contain in particular aircraft configuration data, atmospheric conditions and data on the runway and airport for takeoff or landing.

All of the parameters determined at the end of determination step E101 are intended to be displayed in a display step E102 intended for the pilot. The display should be presented if the subsequent checks validate these results.

During takeoff in particular, data flow 5 contains the values MTOW, V1, VR and V2, and during landing it contains the values Vapp, LD, $K_{LD}$ and $\Delta V_{REF}$.

All or part of these parameters are sent via data flow 5 for use during step E103 of calculation of regulatory data.

During this step E103 of calculation of regulatory data, these regulatory data are calculated by means of a function similar to one of the calculation functions used in determination step E101, and on the basis of a first subset of the series of input conditions, illustrated by data flow 3.

This first subset of the series of input conditions comprises in particular the data on atmospheric conditions and the aircraft configuration data as well as some runway data, such as runway type, runway slope, runway altitude.

The regulatory data calculated in this way are sent via a data flow 7 to be employed in a step E104 of comparison of these calculated regulatory data with predefined threshold values with a view to establishing whether the takeoff or landing parameters determined in determination step E101 are valid or invalid.

The regulatory data calculated and compared with the predefined threshold values in this way are those described in the foregoing with reference to FIG. 2.

A display step E105 makes it possible to send the pilot a valid or invalid message depending on the result of comparison step E104.

This comparison step E104 makes it possible to compare the regulatory data with predefined threshold values corresponding to a second subset, represented by data flow 2, of the series of input conditions, as well as with data of the aircraft database AFM DB.

This second subset of the series of input conditions comprises in particular data related to a given airport, such as available landing distance TODA, available ground-run distance TORA, available stop distance ASDA or alternatively available takeoff distance LDA.

The threshold data obtained from the aircraft database AFM DB comprise in particular minimum speeds and minimum gradients, as described in the foregoing.

At the end of comparison step E104, a test step E106 is employed in order to determine whether a takeoff or landing phase is involved.

In the case of a landing phase, the checking method is terminated.

Otherwise, in the case of a takeoff phase, the checking method additionally comprises a step E107 of calculating the takeoff distance TOD0 with all engines operative on the basis of determined takeoff parameters such as schematized by data flow 6.

As described in the foregoing with reference to FIG. 2, calculation step E107 employs a different calculation function, for example based on an approximation of the ground-run distance.

This calculation step E107 is employed by using, as in step E103 of calculation of regulatory data, a first subset of the series of input conditions, schematized by flow 3, comprising in particular aircraft configuration data, data on the atmospheric conditions and data on runway type and runway slope.

Step E107 of calculation of takeoff distance TOD0 is followed by a comparison step E108, in which the calculated takeoff distance TOD0 can be compared with an available takeoff distance TODA obtained from data flow 2 of the input conditions.

If the takeoff distance TOD0 is shorter than or equal to the available takeoff distance TODA, a valid message is displayed in a display step E109.

Otherwise, a message indicating to the pilot that the determined parameters are invalid is displayed.

Thus this verification of the calculated takeoff distance TOD0 makes it possible to detect an error in calculation of the takeoff distance that might be caused if the rotation speed VR and climb speed V2 were overestimated by the determination module.

By virtue of this checking method, it is possible to ensure reliability of determination of the parameters established during determination step E101 and to be certain that the results accurately comply with the regulatory constraints.

In addition, the part of the code specific to determination module 50 can be made reliable in this way, making it possible to be certain that it is not generating erroneous results.

Furthermore, the second checking module makes it possible to ensure reliability of the calculation of the takeoff distance with all engines operative, this being a critical value during each takeoff.

When this value is recalculated by a different calculation function, it is possible to verify that the part of the code that calculates the takeoff distance in determination module 50 and in first checking module 60 is not corrupted, and that the data necessary for its calculation and contained in the flight manual AFM are not corrupted.

Finally, by virtue of checking modules 60 and 70, it will be easier to qualify the device since the qualification constraints are able to relate solely to control module 60, and not to determination module 50 and calculation and optimization means 51, which are more complex.

Of course, the present invention is not limited to the practical examples such as described in the foregoing, but instead numerous modifications can be made to these practical examples without departing from the scope of the invention.

In particular, the input data and the calculated parameters are given by way of illustration. Additional parameters can be calculated and checked according to the same principle by the checking modules described in the foregoing.

Thus the checking modules can perform other verifications by comparison of the rotation and climb speeds VR and V2 with regulatory values (minimum control speed in the air VMCA, takeoff speed Vs1g, etc.).

Similarly, the input conditions can be different and can comprise merely a subset of the conditions mentioned hereinabove, or else they can be augmented by additional input conditions.

The invention claimed is:

1. A method for checking takeoff or landing parameters of an aircraft, said method comprising:
    determining said takeoff or landing parameters with an onboard parameters determination module based on a series of input conditions,
    calculating regulatory data based on said determined takeoff or landing parameters;
    comparing said calculated regulatory data with predefined threshold values, and
    establishing whether said determined takeoff or landing parameters are valid or invalid.

2. A checking method according to claim 1, wherein said parameters are calculated with a calculation function corresponding partly to a calculation function of a flight manual certified for use on the ground.

3. A checking method according to claim 1, wherein said regulatory data are calculated with a function identical to a calculation function of a flight manual certified for use on the ground and with an aircraft database certified for use on the ground.

4. A checking method according to claim 3, wherein said regulatory data are calculated based on a first subset of said series of input conditions and on said determined takeoff or landing parameters.

5. A checking method according to claim 1, wherein the predefined threshold values correspond to a second subset of said series of input conditions as well as to data contained in an aircraft database certified for use on the ground.

6. A checking method according to claim 1, wherein said series of input conditions comprises data that depend on the aircraft, data that depend on atmospheric conditions and data that depend on an airport for takeoff or landing of said aircraft.

7. A checking method according to claim 1, wherein said takeoff parameters comprise a maximum takeoff weight, a decision speed, a rotation speed and a climb speed.

8. A checking method according to claim 5, wherein the first subset of the series of input conditions comprises data on atmospheric conditions, data on a runway type, a runway slope and a runway altitude as well as data on aircraft status, and wherein the second subset of the series of input conditions comprises data related to an airport, including an available landing distance, an available ground-run distance, an available stop distance or an available landing distance.

9. A checking method according to claim 1, further comprising :
    calculating a takeoff distance with all engines operative based on determined takeoff parameters; and
    comparing said takeoff distance with an available takeoff distance belonging to said series of input conditions for establishing whether said determined takeoff parameters are valid or invalid.

10. A checking method according to claim 9, wherein said step of calculating said takeoff distance with all engines operative is performed with a calculation function that is different from the calculation function used in said step of determining said takeoff or landing parameters and from a calculation function used in the step of calculating said regulatory data.

11. A checking method according to claim 10, wherein said step of calculating said takeoff distance with all engines operative is performed with an aircraft database that is different from an aircraft database certified for use on the ground.

12. A device for checking takeoff or landing parameters of an aircraft, said device comprising:
    a parameter determination module configured to determine said takeoff or landing parameters based on a series of input conditions,
    a calculator module configured to calculate regulatory data based on said takeoff or landing parameters; and
    a comparator module configured to compare said regulatory data with predefined threshold values and to establish whether said takeoff or landing parameters are valid or invalid.

13. A device for checking parameters according to claim 12, further comprising:
    another calculator module configured to calculate a takeoff distance with all engines operative based on determined takeoff parameters; and
    another comparator module configured to compare the takeoff distance with an available takeoff distance belonging to said series of input conditions and to establish whether said determined takeoff parameters are valid or invalid.

14. A device for checking takeoff or landing parameters of an aircraft, said device including modules configured to employ the checking method according to claim 1.

15. An aircraft equipped with a checking device according to claim 12.

16. An aircraft configured to employ the checking method according to claim 1.

* * * * *